Dec. 12, 1939.  E. W. BRINKMAN  2,182,939
AUTOMATIC WORK FORMING MACHINE
Filed Feb. 1, 1938  4 Sheets-Sheet 1
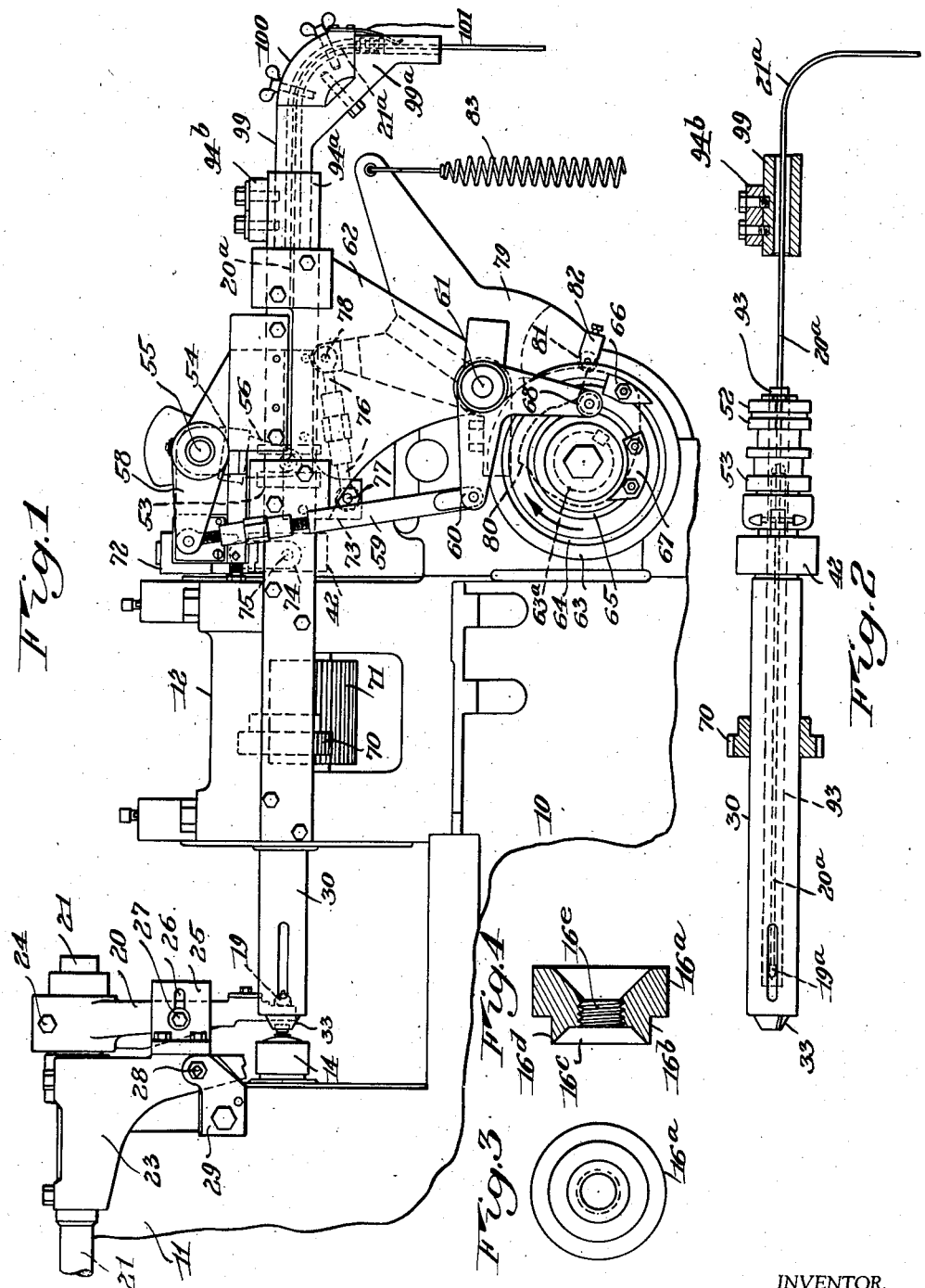
INVENTOR.
Earl W. Brinkman
BY
Cumpston & Shepard
his ATTORNEYS Dec. 12, 1939.  E. W. BRINKMAN  2,182,939
AUTOMATIC WORK FORMING MACHINE
Filed Feb. 1, 1938  4 Sheets-Sheet 2
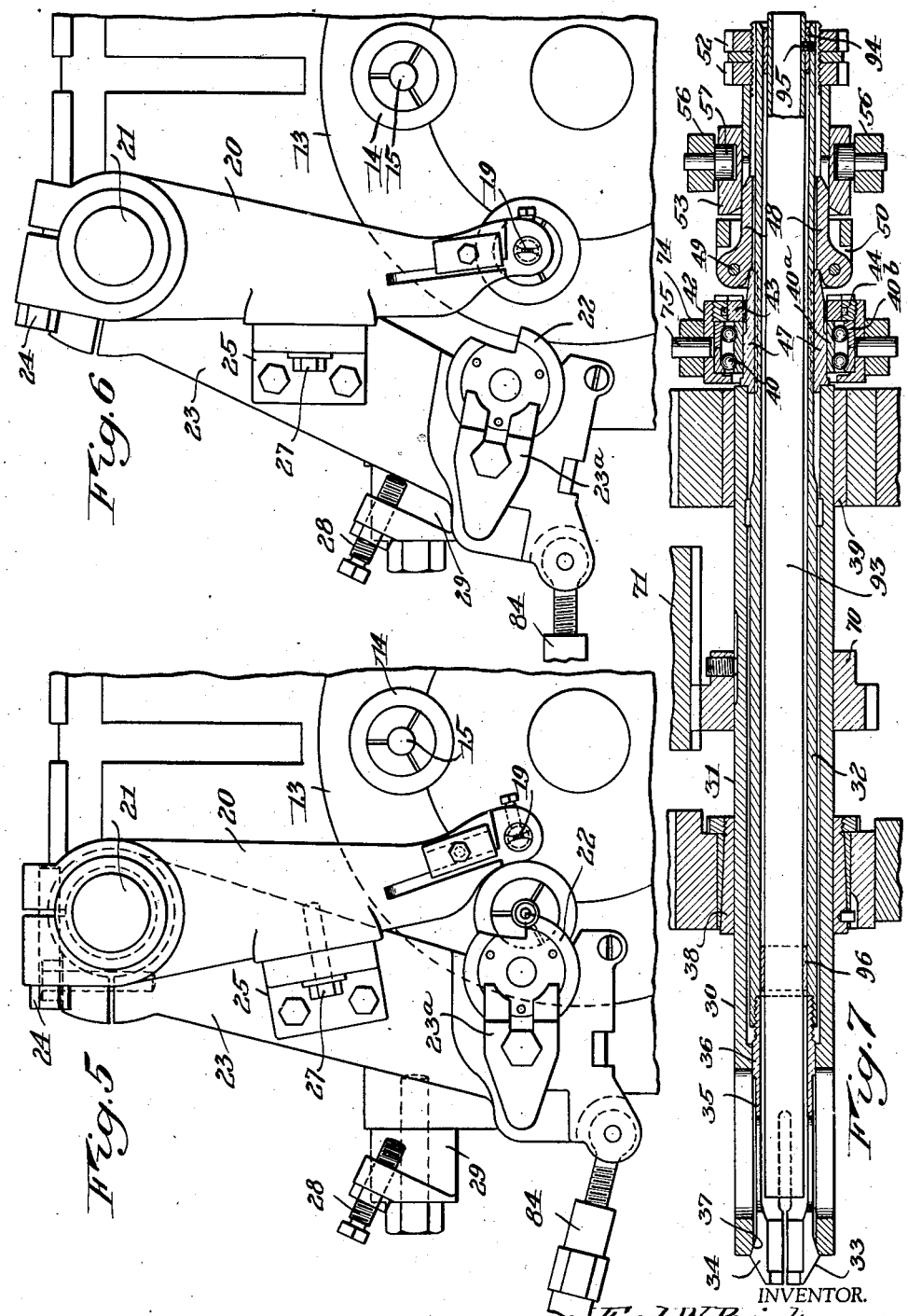
INVENTOR.
Earl W. Brinkman
BY Cumpston & Shepard
his ATTORNEYS

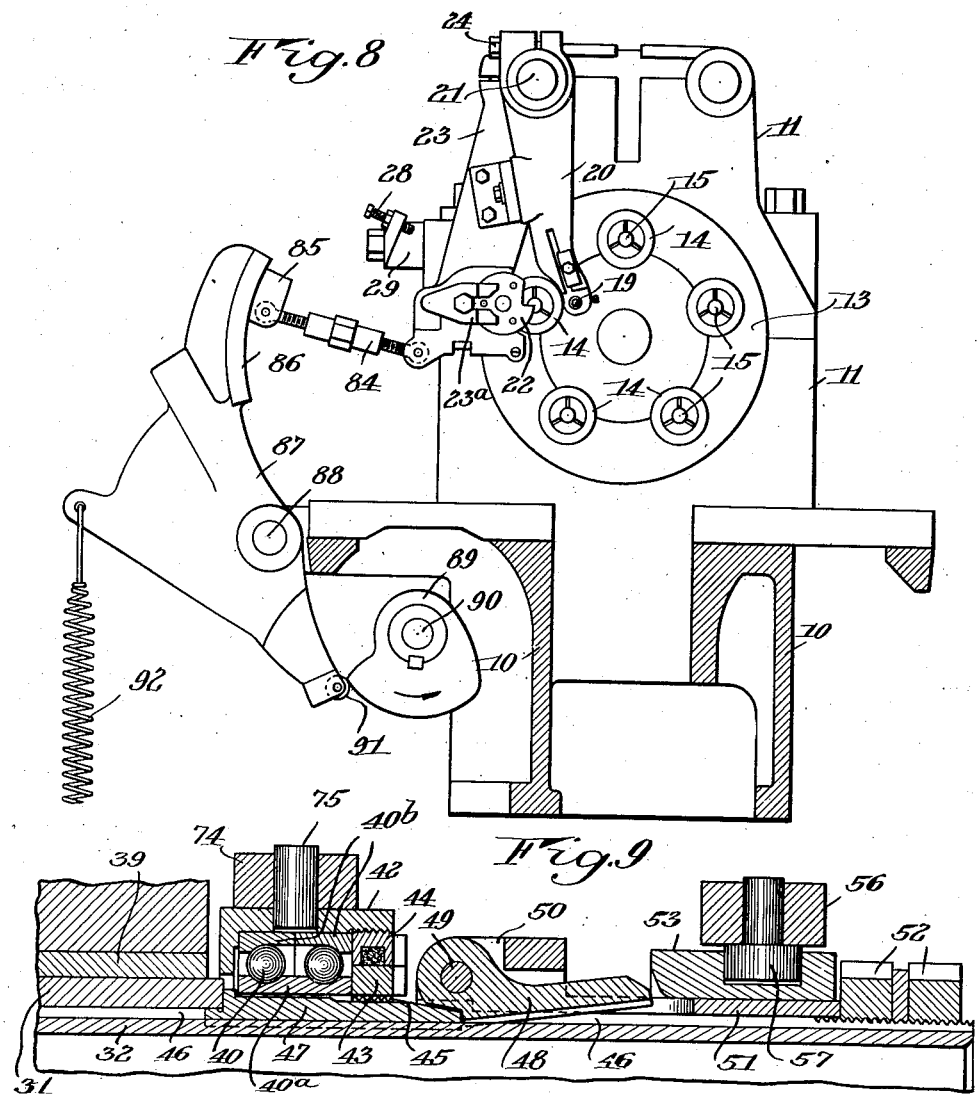
Fig. 8
Fig. 9
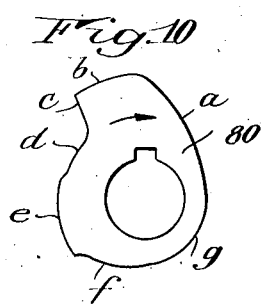
Fig. 10
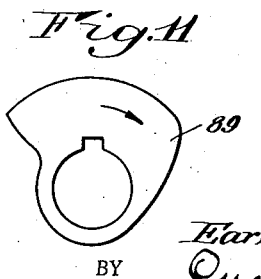
Fig. 11
INVENTOR.
Earl W. Brinkman
BY Cumpston & Shepard
his ATTORNEYS Dec. 12, 1939.  E. W. BRINKMAN  2,182,939
AUTOMATIC WORK FORMING MACHINE
Filed Feb. 1, 1938   4 Sheets-Sheet 4
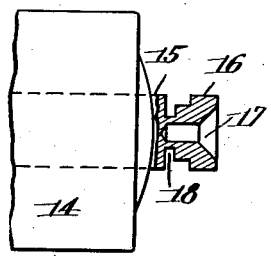
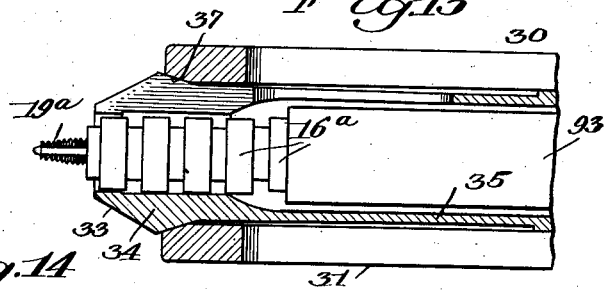
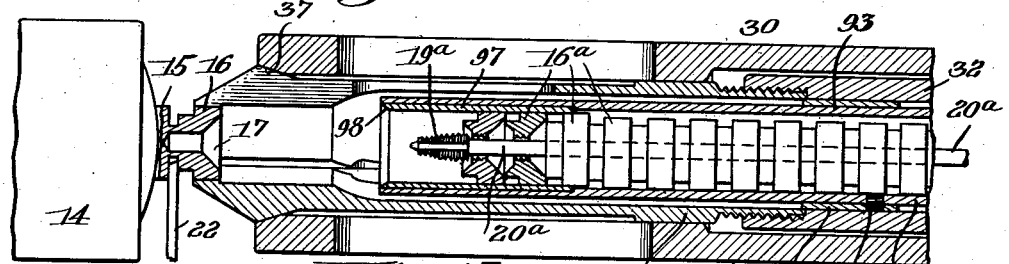
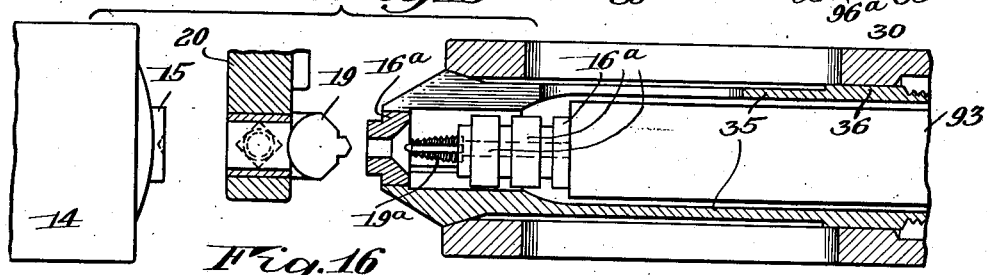
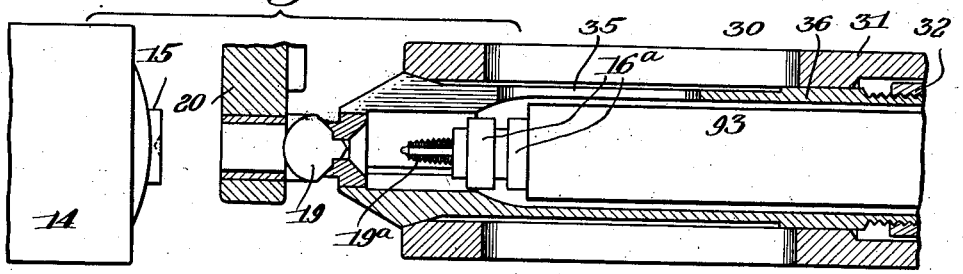
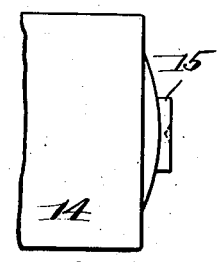
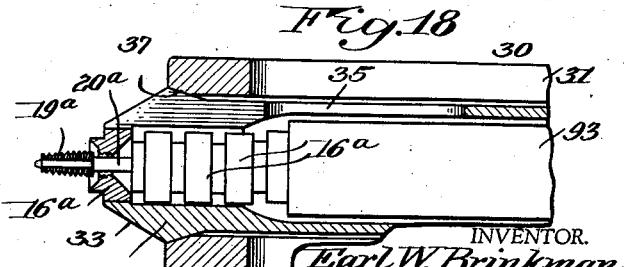
INVENTOR.
Earl W. Brinkman
BY Cumpston & Shepard
his ATTORNEYS Patented Dec. 12, 1939

2,182,939

UNITED STATES PATENT OFFICE 2,182,939

AUTOMATIC WORK FORMING MACHINE

Earl W. Brinkman, Rochester, N. Y., assignor to Davenport Machine Tool Co., Inc., Rochester, N. Y., a corporation of New York Application February 1, 1938, Serial No. 188,129

35 Claims. (Cl. 29—37)

The present invention relates to automatic machines, such as those, for example, known as automatic screw machines, for performing various operations on different classes of work.

One object of the invention is to provide an improved machine of the above character capable of efficiently performing in the same machine an increased variety of operations, including, for example, the cutting off, counterboring from either or both ends, and tapping operations, and others as well, whereby to avoid, not only the expense of an additional machine or machines, but also that of transferring the work from one machine to another and employing skilled operators for the same.

Another object of the invention is to provide an improved arrangement and combination in which an automatic pick-up device is employed to grip and carry a severed work portion into coaction with a tool for operating upon the end last severed from the work piece. More specifically stated, the objects include employment of such a pick-up device to carry the work portion for coaction with tools for operating upon it at both of its ends, as, for example, tools for counterboring such work portion from one end and tapping it from the other end, in the same machine.

A further object of my invention is to provide a machine for performing tapping operations wherein the work piece to be tapped is rotated while rigidly held and moved or drawn over a rigid tapping tool whereby the work piece and the tapping tool are held rigidly in alinement and the threads are accurately formed.

To these and other ends the invention resides in certain improvements and combinations of parts, all as will be hereinafter more fully described, the novel features being pointed out in the claims at the end of the specification.

In the drawings:

Fig. 1 is a fragmentary side elevation of a machine embodying one form of the invention;

Fig. 2 is a side elevation of the tapping spindle and associated parts shown removed from the machine;

Fig. 3 is an end view of one of a number of work pieces capable of being formed by a machine constructed in accordance with the invention;

Fig. 4 is a section taken centrally through the work piece shown in Fig. 3;

Fig. 5 is a fragmentary end elevation showing the work severing and end forming or counterboring tools with the severing tool at operative position;

Fig. 6 is a similar view showing the severing tool withdrawn and the counterboring or end forming tool at operative position;

Fig. 7 is a longitudinal section through the work holding and tapping spindle shown in Fig. 2, drawn to an enlarged scale;

Fig. 8 is a transverse sectional elevation through the machine showing the operating mechanism for the work severing and forming elements;

Fig. 9 is a longitudinal section through a portion of a collet or chuck operating and tapping spindle showing the chuck control lever at release position;

Fig. 10 is an end view of a cam for controlling the operations of the tapping spindle;

Fig. 11 is a view of a cam for controlling the operations of the means for severing the work and positioning the counterboring or end forming tool;

Fig. 12 is a view showing a portion of one of the work supporting spindles with a partially formed work piece on the stock bar projecting therefrom;

Fig. 13 is a longitudinal section through the inner end of the tapping spindle showing the work gripping chuck or collet ready to be moved into position to grip the work;

Fig. 14 is a similar section showing the tapping spindle moved to position the collet or work holding means in gripping engagement with the work piece and also shows the cut-off tool in position to sever the work piece;

Fig. 15 shows the tapping spindle retracted and the burring or countersinking tool moved to operative position between the work and tapping spindles;

Fig. 16 shows the tapping spindle in advanced position with the burring or countersinking tool at the position it occupies during the countersinking operation;

Fig. 17 is a view similar to Fig. 12 with the partially formed work piece removed, and Fig. 18 shows the tapping spindle in the position to which it is moved to effect cooperation between the work piece and the tapping tool to complete the tapping operation.

The same reference numerals throughout the several views indicate the same parts.

The invention is intended for use in connection with machines of either the multiple or single spindle type such, for example, as an automatic screw machine of the multiple spindle type as illustrated and in which the work bars are rotated by spindles carried by a rotary work head having suitable indexing mechanism and in which the work is advanced step by step to be operated upon by one or more tools preparatory to the work severing operations, such, for example, as the operations of counterboring and necking or grooving the work as shown in Fig. 12. The invention in one form embodies generally mechanism for severing the work, one or more drilling, counterboring, or end forming tools for operating on the severed work pieces, combined pick-up and tapping devices in which the pick-up device grips and holds the work during the severing operation, withdraws the severed work from the stock bar to allow the counterboring, end forming, or drilling tool to be moved to operative position relative to the work, advances the work for coaction with the end forming or other tool and then effects coaction between the work and the tapping tool to tap the work, the said operations being performed in a predetermined sequence and without interruption, and the pick-up device supporting the work during the severing operation and subsequent thereto until the tapping operation is completed.

Referring to the drawings, 10 designates a base of an automatic screw machine which is provided with spaced upstanding frame portions 11 and 12 for supporting different parts of the operating mechanism. The frame portion 11 is provided with a work spindle carrier 13 mounted for rotation therein, the carrier having a series of rotary work spindles 14 for rotating and feeding the work such, for example, as the stock rods 15, one of which is shown as having a partially formed work piece 16 thereon counterbored at 17 and necked or grooved at 18 preparatory to the final cut-off or severing operation. It will be understood that any suitable and well known means, not shown, may be employed to perform or condition the work piece, as shown, for example, in Fig. 12, or otherwise as desired.

The severed work piece 16a is in the form of a nut as best shown in Fig. 4, but it will be understood that a machine constructed in accordance with the invention may be employed to produce a variety of work forms of different shapes and sizes. The nut 16a is of special form since it is provided with a reduced portion 16b for insertion through an opening in a supporting member to which the nut is to be attached, said reduced portion being countersunk at 16c to provide a relatively thin annular edge portion 16d which can be readily spun over upon the supporting member to secure the nut thereon. The nut is tapped or threaded at 16e to receive a bolt, screw, or other threaded part, not shown.

The tool for performing an operation on the cut off end or face of the work piece may be a forming tool 19 provided the perform a countersinking, burring, or other forming operation on the cut off face or end of the work piece. The forming tool 19 is suitably connected with an arm 20 secured on a rock shaft 21 journaled in a portion of the frame member 11, Figs. 1 and 8. The work severing or cut-off tool for operating within the groove 18 of the stock bar 15 is indicated at 22 in Figs. 5, 8, and 14, and is detachably connected with an arm 23 by any suitable means. The arm 23 is also connected with the rock shaft 21 and with the arm 20 and is thereby made to swing with the arm 20 carrying the forming tool 19. The arm 20 is clamped upon the rock shaft by a screw 24 which can be loosened to permit the arm to be adjusted longitudinally of the shaft in order that the countersinking tool 19 may be adjusted axially of the work tapping spindle to accommodate it to work pieces of different thicknesses or to permit different size tools to be attached to the arm for operation upon the work piece. The arm 20 is also rigidly connected with the arm 23 by means of a bracket 25 which is provided with an elongated slot 26 for the reception of a screw 27 for securing the arm 20 at different positions upon the bracket.

The extent of the outward movement of the arm 23 may be varied if desired within certain limits by an adjustable set-screw 28 threaded in a bracket 29 suitably connected with the frame 11, the set-screw being disposed for engagement with the arm when the latter is in its outermost position, as shown in Fig. 6. Means is thus provided for centering the burring or countersinking tool 19 relative to the axis of the work gripping and tapping spindle, designated generally by the reference numeral 30, Figs. 1, 2, and 7.

The work gripping and tapping spindle 30 comprises an outer tubular member 31 and an inner tubular member 32 provided at its inner end with a work chuck or collet of any suitable design, designated generally by the reference numeral 33, and preferably comprising a plurality of work gripping jaws or spring fingers 34 having resilient arms 35 formed integral with the inner end section 36 of the tubular member 32 which is made detachable from the outer section by threading it within the latter, as shown in Fig. 7. The spring jaws are provided with beveled or cam surfaces which cooperate with the inner wall 37 of the outer tubular member to force the jaws into engagement with the work portion 16 of the stock rod 15, as shown in Fig. 14, when the chuck or collet is operated by effecting movement of the tubular members 31 and 32 one axially of another in a manner described hereinafter.

The work tapping spindle 30 is mounted for reciprocation and rotation in suitable bearings 38 and 39 carried by the frame 12, Figs. 1 and 7. The inner tubular member 32 is also extended through a bearing 40 including the inner and outer ring-like sections 40a and 40b, as shown in Fig. 9, the inner section being seated on an enlarged annular portion of the inner tubular member formed adjacent the main bearing 39. The bearing 40 is enclosed within a housing 42 and is held in position therein by the threaded rings 43 and 44, the former being screwed upon a threaded portion 45 of the inner spindle 32, and the latter within the outer end of the housing, as shown in Figs. 7 and 9.

The inner spindle 32 is also provided with longitudinally extending oppositely positioned slots 46 within which are disposed a pair of shifter keys 47, the inner ends of which abut the outer end of the spindle 31, as shown in Figs. 7 and 9, the keys being free to slide within said slots and serving when operated as described hereafter to effect relative movement axially between the telescoping spindles 31 and 32 to insure movement of the spring jaws 34 to work gripping position through engagement of the same with the cam surfaces 37 of the outer spindle 31. The jaws will thus be made to grip the work portions when the spindle is at the position shown in Fig. 14 and will hold the work during the severing operations, and thereafter as well in order that the work countersinking and tapping operations may be completed, as shown in Figs. 16 and 18, respectively.

The means for cooperating with the keys 47 to effect relative movement axially between the spindles 31 and 32 comprises a pair of levers 48 pivoted at 49 on the upstanding lugs 50 of a sleeve 51. The levers 48 are slidable on the outer end of the inner tubular spindle 32, as shown in Figs. 7 and 9. The sleeve is held against outward movement on the spindle by the nuts 52 threaded thereon. The levers are operated to effect relative movement axially between the telescoping spindles to close the spring jaws 34 by sliding the collar 53 on the sleeve 51 from the position shown in Fig. 9 to that shown in Fig. 7 to cause the levers to swing inwardly and to urge the shifter keys 47 in engagement with the outer spindle 31 so that movement of one of the telescoping spindles axially of the other will be effected whereby the spring jaws 34 of the collet will be positively actuated through contact with the cam surface 37 of the spindle 31. Sliding of the collar 53 to and from operating position is effected by a cam actuated fork 54 pivoted at 55 upon a suitable support, the arms 56 of the fork being provided with pins 57 operatively engaging the collar in the annular groove 58 thereof, Figs. 7 and 9.

Operation of the fork is effected by an arm 58 connected therewith, the arm having one end of an extensible link 59 pivotally connected therewith, the opposite end of the link being likewise connected with a lever 60, pivoted at 61 upon a bracket 62, supported upon the frame of the machine by any suitable means, not shown. Operation of the lever 60 is effected by a rotary member or cam carrier 63 supported on a shaft 63a for rotation by gearing or other suitable means, not shown. The cam carrier 63 is provided with outer and inner circular grooves 64 and 65, respectively, for the reception of the heads of suitable bolts for adjustably securing the lever operating cams 66 and 67 to said member. The cams are adapted for engagement with a roller 68 on the vertical arm of the lever whereby to alternately swing the lever in opposite directions to actuate the link 59, with the result that the fork 54 will be actuated to first slide the collar 53 to operate the levers 48 to effect closing of the spring jaws 34 by effecting axial movement between the outer and inner spindles 31 and 32, after which the fork will return the collar to inoperative position to release the levers 48. When this is done the spring jaws of the collet will effect relative movement axially between the spindles 31 and 32, at which time the jaws will open to release the work piece held thereby.

The means for rotating the combined tapping and work holding spindle 30 comprises a gear 70 fixed on the outer tubular member 31 of the spindle, said gear being in mesh with and driven by another gear 71 in engagement with which the gear 70 is free to slide upon reciprocation of the outer spindle 31 within the bearings 38 and 39, or upon moving said spindle between the inner and outer positions, shown in Figs. 14 and 18, respectively. Any suitable means, not shown, may be provided for rotating the gear 71, it being understood that it will drive the gear 70 and therefore the spindle 30, said spindle being driven at a speed corresponding to that of the spindle for rotating the work bar 15.

It will be understood that if work pieces of odd shapes, such for example as square, hexagonal, or rectangular shapes are to be operated upon that the work feeding and pick-up spindles can be synchronized to permit the latter to pick up the work during rotation of the same.

The mechanism for reciprocating the work tapping spindle 30 for the purpose of moving it between the work gripping position shown in Fig. 14 and that for completing the tapping operation, shown in Fig. 18, comprises a fork-shaped member 72 pivotally connected with a slide 73 by suitable means, not shown. The arms 74 of the fork extend on opposite sides of the bearing housing 42, which is rigidly connected with the inner spindle or tubular member 32, pins 75 being employed to connect said arms with the housing, as shown in Fig. 9. The slide 73 is mounted for reciprocation on a suitable support, not shown, and is actuated by a rod 76 pivotally connected at 77 with the slide and at 78 with a lever 79 mounted to swing about the axis 61 of the lever 60, Fig. 1. The lever 79 is operated by a cam 80, shown in Fig. 10, which engages a roller 81 carried by a holder 82 suitably connected with the lever, the roller being held in engagement with the cam in the different positions of the latter by a spring 83, Fig. 1. The parts $a$, $b$, $c$, $d$, $e$, $f$, and $g$ of the cam correspond respectively to the periods of advancement of the spindle to move the chuck in engagement with the work, holding the work during the severing operation, retraction of the spindle to the position of Fig. 15, the dwell at said position, the burring operation, the tapping operation, and the return of the spindle to the position at which the chuck is automatically released. It will be understood that the previously described mechanism for operating and releasing the levers 48 for effecting the opening and closing of the chuck jaws is designed to operate in proper timed relation to the operations of the cam 80 in advancing and retracting the tapping spindle.

The cutting or severing tool 22 carried by the swingingly mounted arm 23 is moved to and from engagement with the work by moving the arm between the positions shown in Figs. 5 and 6. Operation of the arm is effected by an extensible link 84 pivotally connected with the lower end of the arm and with a block 85 adjustable on an arc-shaped guide 86 on the upper arm of a rocking lever 87. The lever is pivoted on a shaft 88 carried by the frame 10 and is moved in one direction by a cam 89 on a shaft 90 through engagement with a roller 91 on the lever, the lever being moved in the opposite direction by a spring 92 anchored by suitable means, not shown. Operation of the arm 23 in the manner described will, of course, effect operation of the arm 20 connected therewith to move the burring or countersinking tool 19 to and from coaxial position relative to the work chuck and in proper timed relation to the movements of the tapping spindle 30.

Mounted within the collet carrying spindle 32 is a relatively long work supporting tube 93 which has its outer end supported within the spindle by a collar 94 secured to the spindle and tube by a set-screw 95, Fig. 7, whereby said tube will be reciprocated by the spindle. The tube 93 is also supported at its inner end by a collar 96 sleeved within the tubular member 32 and secured thereto by a set-screw 96a, Fig. 14. The tube 93 can be withdrawn when desired from the spindle upon removal of the nuts 52 thereon and the set-screw 95. It will be understood that if desired the tube 93 can be extended to and fixed upon a suitable support such, for example, as that indicated at 94a in Fig. 1, in which case the tube 32 will rotate in surrounding relation relative to the tube 93. Inserted within the inner end of the tubular member 93 is a short bearing sleeve 97 the inner diameter of which as well as that of the tube 93 is such as to permit the work pieces 16a to freely pass therethrough. The inner end of said sleeve is beveled at 98 to facilitate passage of the work pieces thereto.

The tapping tool 19a is supported by its shank 20a, which is extended through the tube 93 and which forms a guide rod for the work pieces 16a, to be advanced through the tube, said rod having its outer end bent as indicated at 21a to cause the work pieces to be discharged downwardly from the machine, it being understood that the work pieces 16a occupy the whole effective length of the guide rod during operation of the machine. The guide rod 20a is supported by the work pieces within the sleeve 97 of the tube 93 whereby the inner end of the rod and the tapping tool thereon are properly centered with respect to the axis of the collet 33. Likewise the rod is supported by the work pieces within the tube throughout the length thereof. The work pieces upon leaving the tube continue to move on the rod which is extended through a wrench 99, connected with an arm 94b extending rearwardly from the support 94a. The wrench comprises a main section 99a, and a detachable section 100 provided with a curved passage, the opposite ends of which register with the passages of said main section, said intermediate section being secured in position by suitable bolts, as shown in Fig. 1. A spring 101 is secured to the section 100 of the wrench and has its free end disposed in the path of the work pieces and serves to prevent discharge of the same, except upon completion of each tapping operation, at which time the pressure of the work piece completed by the tapping tool and moved by the collet will be sufficient to move all of the work pieces on the guide rod so that the one contacting the spring will be pushed past the latter and discharged from the rod, after which the spring will return to normal operating position.

It will be understood that in cases where it may be desired to operate on work pieces of different lengths that the tap supporting rod or shank may be adjusted axially of the tapping spindle to accommodate the tool to such work pieces. It will be further understood that tapping tools of different lengths may be employed when it is desired to operate on different lengths of work, In the operation of the machine the stock bar 15 is constantly rotated and advanced step by step through the work holding spindle 14, operated by suitable mechanism, not shown, the turret head 13 carrying the spindles being also operated by suitable indexing mechanism, not shown. The tapping spindle 30 is reciprocated by the slide 73 connected therewith, the lever 79 and the cam 80, the spindle being first moved to the position shown in Fig. 14 at which time the collet 33 will be actuated to grip the work upon movement of the slide 53 from the position shown in Fig. 9 to that shown in Fig. 7. Movement of the slide 53 is effected by the fork 56, arm 58, link 59 and lever 60 upon rotating the cam 66 in engagement with the vertical arm of the lever, the tapping spindle at this time being rotated by the gears 70 and 71, at the speed of rotation of the spindle carrying the stock bar 15, and during which time the cam 89 will operate the lever 87 to advance the severing tool 22 into engagement with the work piece to sever the same. Upon completion of the severing operation the tapping spindle will be retracted by the cam 80 to the position shown in Fig. 15 and the spring 92 will then operate the lever 87 whereby the cutting tool will be withdrawn from operative position and the forming tool 19 moved into coaxial relation with respect to the tapping spindle. The spindle will then be advanced to the position shown in Fig. 16 and the work piece rotated in engagement with the forming tool 19 to perform the burring or countersinking operation. Upon completion of the countersinking operation the tapping spindle will be moved axially in an outward direction by the cam 80 to move the work piece in engagement with and axially of the tapping tool to complete the tapping operation, as shown in Fig. 18, the spindle continuing its outward movement and causing the work piece held by the chuck to advance the remaining work pieces on the guide rod 20a to effect discharge of the outermost piece from the rod. At about this time the cam 67 on the cam carrier 63 will move into engagement with the vertical arm of the lever 60 to effect movement of the slide 53 from the position shown in Fig. 7 to that shown in Fig. 9, whereby to relieve the pressure on the keys 47 to permit the spring jaws of the collet to release the work carried thereby.

It will be particularly noted that the work piece while rotating is firmly held by the gripping jaws against any movement with respect to the jaws, is moved over the tap and not released until the tapping operation is completed. In addition the tap is firmly held in position by the work pieces along the shank. This prevents the work from moving or tipping with respect to the tap and thus the tapping tool and work piece are accurately centered with respect to each other during the tapping operation. Moreover, it will be noted that the tap is located between the rigidly held and rotating work piece and the operating means for moving the spindle so that the action is one of drawing the work piece while firmly held and rotating over the tap. More accurate tapping may be accomplished in this manner.

While one embodiment of the invention has been disclosed, it is to be understood that the inventive idea may be carried out in a number of ways. The invention shown and described herein, therefore, is not to be limited to the precise details included, but is intended to cover all variations and modifications thereof falling within the spirit of the invention or the scope of the appended claims.

I claim:

1. In an automatic machine of the class described, a work holder, a tapping tool in alinement with the work holder, a forming tool movable to and from operative position in coaxial relation with the tapping tool, mechanism for rotating and moving the work holder to effect successive coaction between the work and said forming and tapping tools, and means for moving the forming tool to and from operative position in timed relation to the movements of the work holder.

2. In an automatic machine of the class described, a tapping tool, a forming tool movable from inoperative to operative position in coaxial relation with the tapping tool, a rotary work holder coaxial with the tapping tool and movable transversely to the direction of movement of the forming tool, mechanism for effecting relative movement between the work holder and the forming tool to effect coaction between said forming tool and the work and for effecting relative movement between the holder and the tapping tool to tap the work, and means for moving the forming tool to and from said operative position in timed relation to the tapping operations.

3. In an automatic machine of the class described, a work support, means for severing portions of the work, a tapping tool, a rotary work chuck for gripping the portion of the work severed by said severing means and movable axially of the tapping tool, a work forming tool movable transversely to the direction of movement of the chuck to and from operative position between the work support and the severed work portion carried by the chuck, and mechanism for moving the chuck to grip said work portion and effect coaction between the same and the forming and tapping tools.

4. In an automatic machine of the class described, a rotary work support, means for severing a portion of said work, a tapping tool, a rotary and axially movable spindle, a plurality of jaws movable relatively to one another on said spindle, mechanism for effecting said movement of said jaws in predetermined timed relation to the axial movement of said spindle for gripping and holding said work portion while being severed, moving the same into coaction with said tapping tool and subsequently releasing the same and means for continuously rotating said spindle during said severing and tapping operations.

5. In an automatic machine of the class described, a rotary work support, means for severing a portion of said work, a forming tool, a tapping tool, a rotary work spindle, a plurality of jaws movable relatively to one another on said spindle to grip and release said work portion, mechanism for actuating said jaws and moving said spindle longitudinally in predetermined timed sequence to grip and hold said work portion while being severed, move the same into coaction at its opposite ends with said forming and tapping tools, respectively, and to subsequently release the same and means for continuously rotating said spindle during said severing, forming, and tapping operations.

6. In an automatic machine of the class described, a rotary work support, means for severing a portion of said work, a rotary and axially movable work spindle, a forming tool, a tapping tool, means for moving one of said tools toward and from the axis of said spindle, a chuck on said spindle between said tools having a plurality of jaws movable relatively to one another to grip and release said work portion, and mechanism for actuating said chuck jaws and moving said spindle axially in predetermined timed sequence to grip and hold said work portion while being severed, move the same in opposite directions for coaction with said tools, and subsequently releasing the same.

7. In an automatic machine of the class described, a rotary work support, means for severing a portion of said work, a rotary work spindle, a forming tool, a tapping tool, means for moving one of said tools toward and from the axis of said spindle, a chuck on said spindle between said tools having a plurality of jaws movable relatively to one another, mechanism for effecting relative movements in opposite directions between said spindle and tools along the axis of said spindle, and mechanism for effecting movement of said jaws to grip and release said work in predetermined timed relation to said relative movements between said tools and spindle.

8. An automatic machine of the character described wherein stock is fed through a sto carrier provided with rotatable stock hold means and rotated about its own axis so that r chine operations may be carried on on the st( the combination of means for gripping the ( of the stock independently of said stock hold means, means for severing a piece from s stock while thus gripped, means including a { for performing an operation on the cut off ( of the stock while thus gripped, and means moving the piece through the machine in same direction as the stock is fed upon rele of said gripping means.

9. An automatic machine of the character scribed wherein stock is fed through a stock c rier provided with rotatable stock holding me and rotated about its own axis so that mach operations may be carried on on the stock, combination of means for gripping the end the stock independently of said stock hold means, means for severing a piece from said st while thus gripped, means including a tool performing an operation on the cut off end of stock while thus gripped, and means for releas said gripping means to release the piece, piece being pushed through the machine in same direction as the stock is fed by succeed pieces.

10. An automatic machine of the character scribed wherein stock is fed through a stock c ried provided with rotatable stock holding me and rotated about its own axis so that mach operations may be carried on on the stock, combination of means for gripping the end the stock independently of said stock hold means, means for severing a piece from said st while thus gripped, means including a tool performing an operation on the cut off end of stock while thus gripped, a tapping tool, me: for tapping the piece with said tapping tool, ǎ means for moving the piece through the mach in the same direction as the stock is fed upon lease of said gripping means.

11. An automatic machine of the character scribed wherein stock is fed through a stock c rier provided with rotatable stock holding me and rotated about its own axis so that mach operations may be carried on on the stock, combination of means for gripping the end the stock independently of said stock hold means, means for severing a piece from said st while thus gripped, means including a tool performing an operation on the cut off end the stock while thus gripped, a tapping t means for moving the piece over the tapping { while the piece is rigidly held, and means for leasing said gripping means at the terminatior said tapping operation, the piece being pus] through the machine in the same direction the stock is fed by succeeding pieces.

12. An automatic machine of the charac described wherein stock is fed through a st( carrier provided with rotatable stock hold means and is rotated about its own axis so t] machining operations may be carried on on stock, the combination of a rotatable spindle alinement with said stock holding means, me: for rotating said spindle in synchronism with stock holding means, means in connection w said spindle for gripping the end of the st( independently of the stock holding means, me: for severing a piece from the stock, the st( being held by both said stock holding means & said gripping means during the severance of piece, and means for moving the piece throt machine in the same direction as the stock
ed upon release of said gripping means.

3. An automatic machine of the character described wherein stock is fed through a stock carrier provided with rotatable stock holding means and is rotated about its own axis so that machining operations may be carried on on the stock, combination of a rotatable spindle in alinement with said stock holding means, means for rotating said spindle in synchronism with the stock holding means, means in connection with said spindle for gripping the end of the stock independently of the stock holding means, means for severing a piece from the stock while thus gripped, and means for releasing said gripping means to release the piece, the piece being pushed through the machine in the same direction as the stock is fed by succeeding pieces.

4. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for severing a piece from the stock while thus gripped, a tapping tool, means for moving the piece over the tapping tool while the piece is thus held, and means for releasing said gripping means at the termination of said tapping operation, the piece being pushed through the machine in the same direction as the stock is fed by succeeding pieces.

15. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock while the stock is held and rotated both by said stock holding means and said gripping means, and means for releasing said gripping means to release the piece, the piece being pushed through the machine in the same direction as the stock is fed by succeeding pieces.

16. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock while thus held by said gripping means, means for moving said spindle carrying with it the severed piece in a direction away from the stock, means for interposing a tool between the stock and the piece, means for moving said spindle toward the tool carrying with it the piece into engagement with the tool to perform an operation on the cut off end of the piece, and means for releasing said gripping means to release the piece, the piece being pushed through the machine in the same direction as the stock is fed by succeeding pieces.

17. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock while thus held by said gripping means, means for moving said spindle carrying with it the severed piece in a direction away from the stock, means for interposing a tool between the stock and the piece, means for moving said spindle toward the tool carrying with it the piece into engagement with the tool to perform an operation on the cut off end of the piece, a tapping tool, and means for moving said spindle carrying with it the piece in a direction away from the stock and relative to said tapping tool so that the piece is drawn over the tapping tool and tapped.

18. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock while the stock is held both by said stock holding means and by said gripping means, means for moving said spindle carrying with it the severed piece in a direction away from the stock, means for interposing a tool between the stock and the piece, means for moving said spindle toward the tool carrying with it the piece into engagement with the tool to perform an operation on the cut off end of the piece, a tapping tool mounted in said spindle concentric therewith, means for moving said spindle carrying with it the piece in a direction away from the stock and relative to the stock tapping tool so that the piece is drawn over the tapping tool and tapped, and means for releasing said gripping means to release the piece, the piece being pushed through the machine in the same direction as the stock is fed by succeeding pieces.

19. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock while the stock is held both by said stock holding means and by said gripping means, means for moving said spindle carrying with it the severed piece in a direction away from the stock, means for interposing a tool between the stock and the piece, means for moving said spindle toward the tool carrying with it the piece into engagement with the tool to perform an operation on the cut off end of the piece, a tapping tool having a shank, said tapping tool and shank being mounted in said spindle concentric therewith and in fixed position, means for moving said spindle carrying with it the piece in a direction away from the stock and relative to said tapping tool so that the piece is drawn over the tapping tool and tapped, and means for releasing said gripping means to release the piece, the piece being pushed through the spindle over said shank by succeeding pieces and the tapping tool being held rigidly in position by said pieces.

20. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for severing a piece from the stock while held by the gripping means, a tapping tool mounted rigidly in position, means for moving the piece while thus rigidly gripped and rotated and drawing it over the tapping tool.

21. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for feeding said spindle toward the stock to bring the gripping means into operative position with respect to the end of the stock, means for severing a piece from the stock while held both by said stock holding means and said gripping means, a tapping tool having a shank, said tapping tool and shank being mounted in said spindle concentric therewith and fixed with respect thereto, means for moving said spindle carrying with it the piece in a direction away from the stock and relative to said tapping tool so that the piece is drawn over the tapping tool and tapped, and means for releasing said gripping means to release the piece, the piece being pushed through the spindle over said shank by succeeding pieces and discharged from the machine without drawing the tapped piece back over the tapping tool.

22. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock, the stock being held by both the stock holding means and the gripping means during the severance of said piece, means for moving said spindle carrying with it the severed piece in a direction away from the stock, means for interposing a tool between the stock and the piece, means for moving said spindle toward the tool carrying with it the piece into engagement with the tool to perform an operation on the cut off end of the piece, a tapping tool having a shank, said tapping tool and shank being mounted in said spindle concentric therewith and in fixed position, means for moving said spindle carrying with it the piece in a direction away from the stock and relative to said tapping tool so that the piece is drawn over the tapping tool and tapped while the piece is rigidly held by said gripping means, and means for releasing said gripping means at the termination of said tapping operation to release the piece, the piece being pushed through the spindle over said shank by succeeding pieces and the tapping tool being held rigidly in position by said pieces.

23. A machine for performing tapping operations on a piece of work comprising, in combination, work holding means, work gripping means, both said work holding and work gripping means positively holding the stock rigidly and against movement with respect thereto, means for transferring the work from said work holding means to said work gripping means while both are rotated in synchronism with each other, said work gripping means rotating the work piece about its own axis, a tapping tool, and means for moving the gripping means so that the work piece is moved over the tapping tool while rigidly held.

24. In a machine for performing tapping operations on a piece of work, the combination of means for gripping the work piece and holding it rigidly in position with the axis of an aperture therein horizontal, means for rotating the gripping means about a horizontal axis to rotate the work piece about its own axis, a horizontally mounted tapping tool, means for moving the gripping means so that the work piece is moved horizontally over the tapping tool while rigidly held, and means for discharging the work piece from the machine without moving the work piece back over the tapping tool.

25. In a machine for performing tapping operations on a piece of work, the combination of means for gripping the work piece and holding it rigidly in position with the axis of an aperture therein horizontal, means for rotating the gripping means about a horizontal axis to rotate the work piece about its own axis, a horizontally mounted tapping tool mounted in rigid alinement with said gripping means and in fixed non-rotatable position, means for moving the gripping means so that the work piece is moved horizontally over the tapping tool while rigidly held, and means for discharging the work piece from the machine without moving the piece back over the tapping tool.

26. In a machine for performing tapping operations on a piece of work, the combination of means for gripping the work piece and holding it rigidly in position, means for rotating the gripping means to rotate the work piece about its own axis, a tapping tool having a shank, said tapping tool and shank being in axial alinement with the gripping means and being held in fixed position, and means for moving the gripping means so that the work piece is moved over the tapping tool while the work piece is rigidly held, the piece being pushed over said shank by succeeding pieces and discharged from the machine without moving the work piece back over the tapping tool, and the tapped pieces extending over said shank adjacent the tap and serving to support the tap.

27. A machine for performing tapping operations on a piece of work comprising, in combination, work holding means, work gripping means, both said work holding and work gripping means positively holding the work rigidly and against movement with respect thereto, means for transferring the work piece from said work holding means to said work gripping means, a spindle associated with said work gripping means, means for rotating the spindle to rotate the work piece about its own axis, a tapping tool, and means for moving the spindle along its own axis to move the work piece over the tapping tool while the work piece is held rigidly in position.

28. In a machine for performing tapping operations on a piece of work, the combination of a spindle, work gripping means in connection with said spindle arranged to hold the work piece rigidly in position with the axis of an aperture therein horizontal, means for rotating the spindle about a horizontal axis to rotate the work piece about its own axis, a horizontally mounted tapping tool, means for moving the spindle along its own axis to move the work piece over the tapping tool while the work piece is held rigidly in position, and means for releasing said gripping means only after the tapping operation is completed.

29. A machine for performing tapping operations on a piece of work, comprising, in combination, work holding means, a spindle, work gripping means in connection with said spindle, both said work holding and work gripping means positively holding the work rigidly against movement with respect thereto and with the axis of an aperture in the work extending horizontally, means for transferring the work from said work holding means to said work gripping means, means for rotating the spindle about a horizontal axis to rotate the work piece about its own axis, a horizontally mounted tapping tool, means for moving the spindle along its own axis to move the work piece over the tapping tool while the work piece is held rigidly in position, and means for discharging the work piece from the machine without moving the work piece back over the tapping tool.

30. In a machine for performing tapping operations on a piece of work, the combination of a spindle, work gripping means in connection with said spindle, means for rotating the spindle to rotate the work piece about its own axis, operating means for moving the spindle along its own axis, and a tapping tool interposed between said gripping means and said operating means so that when the spindle is moved the operating means draws the rotating work piece over the tapping tool, the work piece being held rigidly in position in the rotating gripping means during said tapping operation.

31. In a machine for performing tapping operations on a piece of work, the combination of a spindle, work gripping means in connection with said spindle, means for rotating the spindle to rotate the work piece about its own axis, operating means for moving the spindle along its own axis, a tapping tool interposed between said gripping means and said operating means so that when the spindle is moved the operating means draws the rotating work piece over the tapping tool, the work piece being held rigidly in position in the rotating gripping means during said tapping operation, and means for releasing said gripping means after the tapping operation is completed.

32. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for severing a piece from the stock while thus gripped, operating means for moving the spindle along its own axis, a tapping tool interposed between said gripping means and said operating means so that when the spindle is moved the operating means draws the rotating work piece over the tapping tool, the work piece being held rigidly in position in the rotating gripping means during said tapping operation, and means for releasing said gripping means to release the piece at the termination of said tapping operation.

33. An automatic machine of the character described wherein stock is fed through a stock carrier provided with rotatable stock holding means and is rotated about its own axis so that machining operations may be carried on on the stock, the combination of a rotatable spindle in alinement with said stock holding means, means for rotating said spindle in synchronism with the stock holding means, means in connection with said spindle for gripping the end of the stock independently of the stock holding means, means for feeding said spindle toward the stock to bring the gripping means into operative position with respect to the end of the stock, means for severing a piece from the stock, while the stock is held both by said stock holding means and said gripping means, means for moving said spindle carrying with it the severed piece in a direction away from the stock, means for interposing a tool between the stock and the piece, operating means for moving said spindle toward the tool carrying with it the piece into engagement with the tool to perform an operation on the cut off end of the piece, a tapping tool mounted in said spindle concentric with the gripping means and interposed between said gripping means and said operating means so that when the spindle is moved by said operating means toward the tapping tool the rotating work piece is drawn over the tapping tool, the work piece being held rigidly in position in the rotating gripping means during said tapping operation, and means for releasing said gripping means upon the termination of said tapping operation.

34. A machine for performing tapping operations on a piece of work comprising, in combination, work holding means, work gripping means, both said work holding and work gripping means positively holding the work rigidly against movement with respect thereto, said gripping means including a plurality of jaws movable simultaneously into engagement with the work piece on a plurality of sides thereof, means for rotating the gripping means to rotate the work piece about its own axis, a tapping tool, and means for positively feeding the gripping means so that the work piece is positively moved over the tapping tool while rigidly held.

35. A machine for performing tapping operations on a piece of work comprising, in combination, work holding means, a spindle having gripping means movable simultaneously into engagement with the work on a plurality of sides thereof, both said work holding and work gripping means positively holding the work rigidly against movement with respect thereto, means for transferring the work from said work holding means to said work gripping means, means for rotating the spindle to rotate the gripping means and the work piece about its own axis, a tapping tool, means for moving the spindle positively along its own axis to move the work piece in a positive manner over the tapping tool while the work piece is held rigidly in position until the tapping operation is completed, and means for discharging the work piece from the machine without moving the work piece back over the tapping tool, said tapping tool being held in position almost entirely by a plurality of previously tapped work pieces and the work piece being discharged from the machine by succeeding pieces.

EARL W. BRINKMAN.